United States Patent [19]

Schönebeck

[11] Patent Number: 5,328,351

[45] Date of Patent: Jul. 12, 1994

[54] DEVICE FOR BLOWMOLDING OF PLASTIC

[75] Inventor: Olaf Schönebeck, Hansdorf, Fed. Rep. of Germany

[73] Assignee: Krupp Corpoplast Maschinenbau GmbH, Hamburg, Fed. Rep. of Germany

[21] Appl. No.: 920,622

[22] Filed: Jul. 24, 1992

Related U.S. Application Data

[63] Continuation of Ser. No. 874,058, Apr. 24, 1992.

[30] Foreign Application Priority Data

Apr. 27, 1991 [DE] Fed. Rep. of Germany ....... 4113874

[51] Int. Cl.⁵ ..................... B29C 49/58; B29C 49/64
[52] U.S. Cl. .................... 425/526; 425/534; 425/535; 425/540
[58] Field of Search .......... 425/534, 522, 526, 535, 425/540, 541

[56] References Cited

U.S. PATENT DOCUMENTS

| | | | |
|---|---|---|---|
| 4,214,860 | 7/1980 | Kleimenhagen et al. | 425/526 X |
| 4,373,891 | 2/1983 | Kishida et al. | 425/526 X |
| 4,505,664 | 3/1985 | Craig | 425/534 X |
| 4,693,375 | 9/1987 | Schweers | 425/534 X |
| 4,790,741 | 12/1988 | Takakusaki et al. | 425/535 X |
| 4,850,850 | 7/1989 | Takakusaki et al. | 425/535 X |
| 5,116,217 | 5/1992 | Doudement et al. | 425/534 |

Primary Examiner—Richard L. Chiesa
Attorney, Agent, or Firm—Harness, Dickey & Pierce

[57] ABSTRACT

The device for blow molding of a thermoplastic material contains a heating device for tempering preforms and a blow device for blow forming the preforms into a container. For controlling at least one blow station provided in the region of the blow device at least one preloadable control disk is provided. The control disk is preloaded relative to a carrier disk by at least one pneumatic spring and is connected to a pressure relief device allowing pressure free maintenance.

18 Claims, 9 Drawing Sheets

DEVICE FOR BLOWMOLDING OF PLASTIC

CROSS REFERENCE TO RELATED APPLICATION

This application is a continuation of application Ser. No. 07/874,058, filed Apr. 24, 1992.

BACKGROUND AND SUMMARY OF THE INVENTION

The invention concerns a device for blowmolding a thermoplastic material, which includes a heating device for tempering preforms and a blow device for blowmolding the preforms into a container, and in which at least one preloadable control disk is provided for triggering at least one blow station located in the region of the blow device.

Such devices are used, for example, in order to mold preforms, especially preforms made of polyethylene, into containers. For tempering of the preforms heating elements are provided in the region of the heating facility, which emit the energy tempering the preform. After they are tempered, the preforms are transferred to the blow device, and are there, in the region of blow stations, formed into containers. Especially in the case of blow devices in the form of blow wheels, control disks are used, which, in combination with carrier disks and depending on their rotational positioning, supply pneumatic elements in the region of the blow station with working air. For this purpose groove-shaped recesses are provided in the area of the control disk, which are developed partly to carry pressure and partly to exhaust pressure. Along the groove-shaped recesses holes are drilled in the region of the carrier disk, and via these drillings working pressure is conveyed to the pneumatic elements, or compressed air conveyed to the pneumatic elements is exhausted. To ensure compact construction the control disk is sealed against the carrier disk by a relatively thin, planar gasket. To ensure a sufficiently reliable seal, the control disk is pre-loaded with regard to the carrier disk. The pre-load can occur, for example, in such a way, that the control disk is fixed and the carrier disk is positioned rotatably relative to a center column. In the region of its extension away from the control disk, the carrier disk is equipped with a spring holding it against the control disk. For the design of such a spring it is known to use mechanical spring elements, for example, disk springs.

The use of such disk springs has the disadvantage, that in order to allow the possibility of movement of the carrier disk relative to the control disk and thus to allow the possibility of positioning the blow wheel in a maintenance or service operation, a counter force compensating for the spring force of the disk spring has to be generated by way of a pneumatic supply. This has the consequence that a pressureless operation of the device is not possible. Especially in the case of problems in the region of the machine or for carrying out service- or adjustment work, working without pressure is desirable to avoid danger to persons working near the device.

The use of mechanical spring elements has further the disadvantage that during assembly tensile forces have to be generated which increase the assembly cost.

It is the task of the present invention, therefore, to improve a device of the introductorily named type in such a manner, that the assembly and service qualities are improved.

In accordance with this invention the problem is solved, in that the control disk is preloadable vis-a-vis a carrier disk by at least one pneumatic spring is connected to a pressure release device allowing pressure-free maintenance operations.

The use of a pneumatic spring makes it possible, to divert the pre-load force of supply pressure to be distributed. When the supply pressure is removed then the spring force is removed at the same time. In the case of performing maintenance in the absence of pressure it is thus possible to perform rotational movements in the region of the blow wheel without compensating for the mechanical pre-load forces. The use of a pre-load device in the form of a pneumatic spring has the further advantage, that for the assembly no pre-load forces need to be generated. The elements of the pneumatic spring can rather be assembled with introduction of a significant force and the pre-load forces are not provided until the start of operation after actuation of the supply pressure.

According to a preferred embodiment of the invention it is proposed that the pneumatic spring is formed at least one piston covered with a membrane. Such membranes are especially suited for carrying out short stroke adjustment motions and facilitate the positioning of a piston, which transmit the pre-load to the carrier disk.

According to another preferred embodiment provision is made that the piston is formed as an annular piston which is arranged essentially concentric with the axis of motion of the carrier disk. By forming it as an annular piston it is assured that in spite of a relatively simple drive a large pressure surface is provided and thus an effective power transmission is made possible.

According to a further preferred embodiment, the assembly and maintenance properties are additionally improved, in that a two step pressure reducer is used for adjusting the supply pressure. The two step construction makes it possible to make a preadjustment by means of pressure regulator, which, for example, is equipped with a handwheel, which is then used for the adjustment of the main pressure regulator. Hitherto required extensive mechanical adjustment efforts are thus avoided.

A further improvement of the assembly properties is achieved in that at least in the region where transfer elements connect the heating device with the blow device, torsionally stiff couplings are provided. The use of such couplings has the advantage that an assembly with relatively large tolerances can be carried out and deviations regarding tilt and a mismatch in the region of rotational shafts can be compensated.

Further details of the present invention emerge from the subsequent detailed description and the attached drawings, in which, for example, preferred embodiments of the invention are shown.

DETAILED DESCRIPTION OF THE PREFERRED EMBODIMENT

Figure 1:
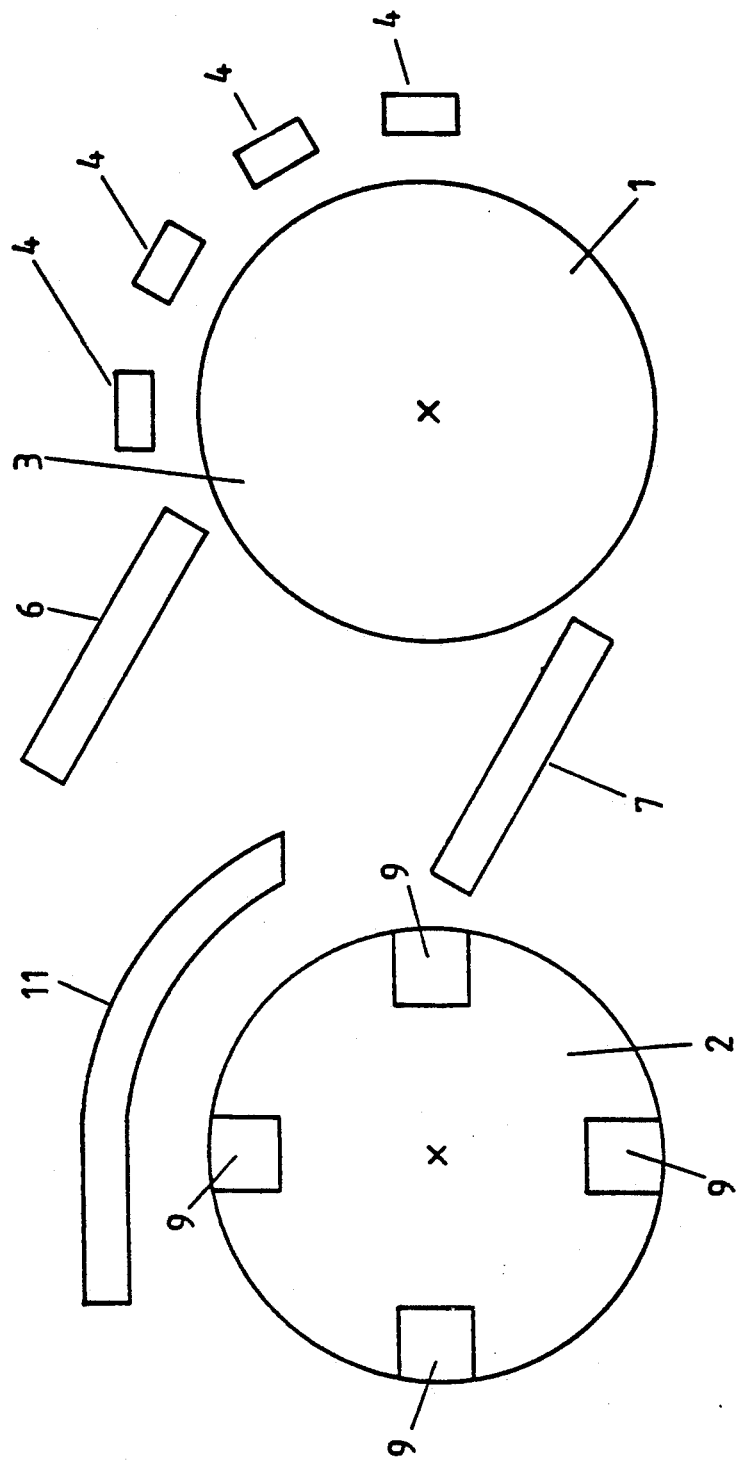
FIG. 1: A basic presentation of an apparatus consisting essentially of heating wheel and a blow wheel.

A device for blow molding of plastic consists essentially of a heating device (1) and a blow device (2). In the embodiment according to FIG. 1 the heating device (1) is made as a heating wheel (3), which is mounted capable of rotation and in the region of which heating elements (4) are disposed which temper preforms (5) made of a thermoplastic material. The preforms (5) are transferred by a feed passage (6) to region of the heating wheel (3). After sufficient tempering the preforms (5) are transferred by a transfer device (7) to the blow device (2) made as a blow wheel (8). In the region of the blow wheel (8) there are blow stations (9) which receive the preform (5) to be shaped and in the region of which the preform (5) is subject to a blow pressure which pushes it against the die halves of blow station (9) and shapes it into a preset container contour. After complete forming of the container (10) to be generated, for example a bottle, the container (10) is removed from the region of the blow wheel (8) by means of removal device (11).

Figure 2:
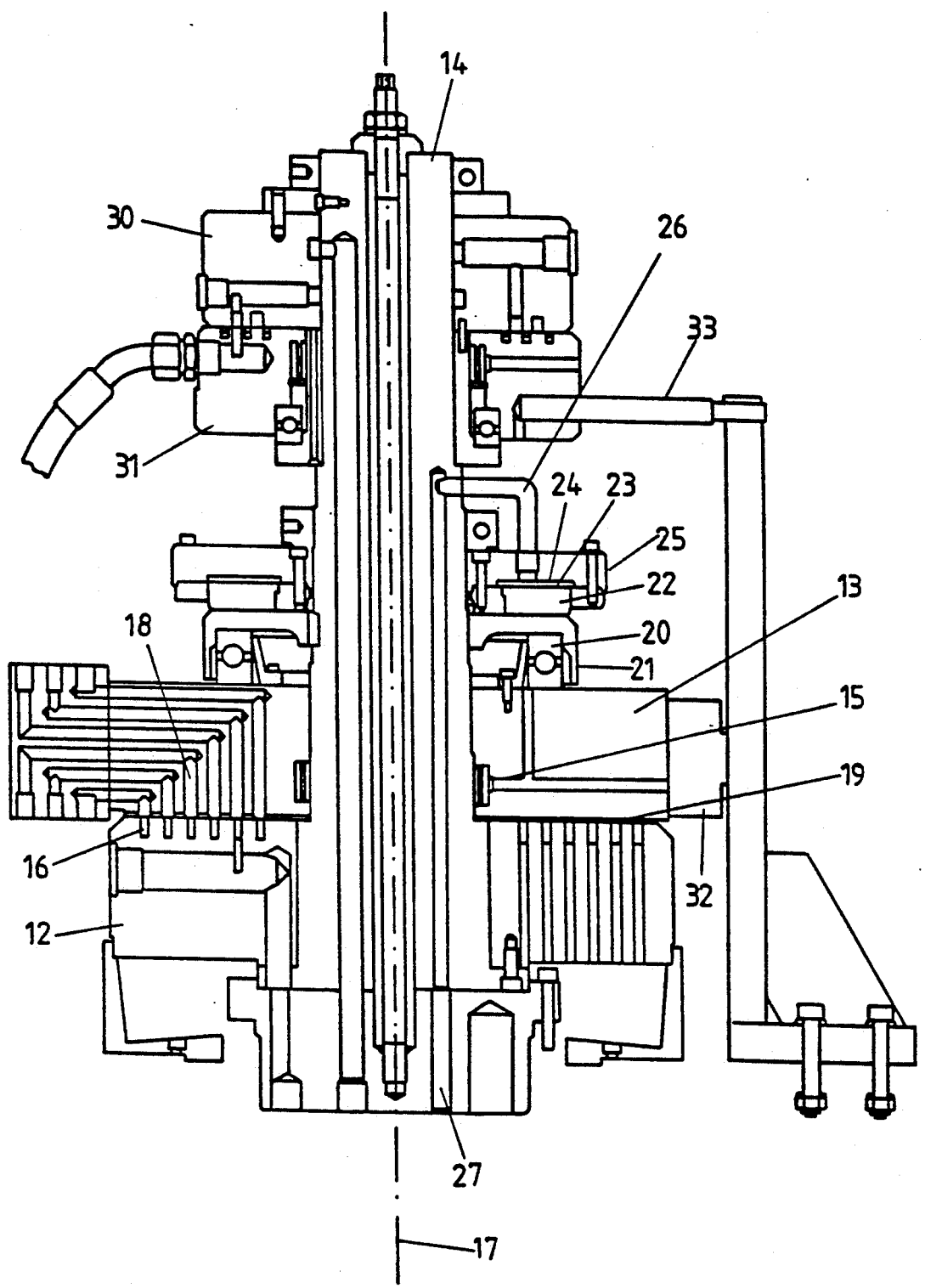
FIG. 2: a partially sectioned side view of a blow device equipped with a control disk and a carrier disk mounted in such a way that it is capable of rotation and where the carrier disk and the control disk are forced against each other by a pneumatic spring.
Figure 3:
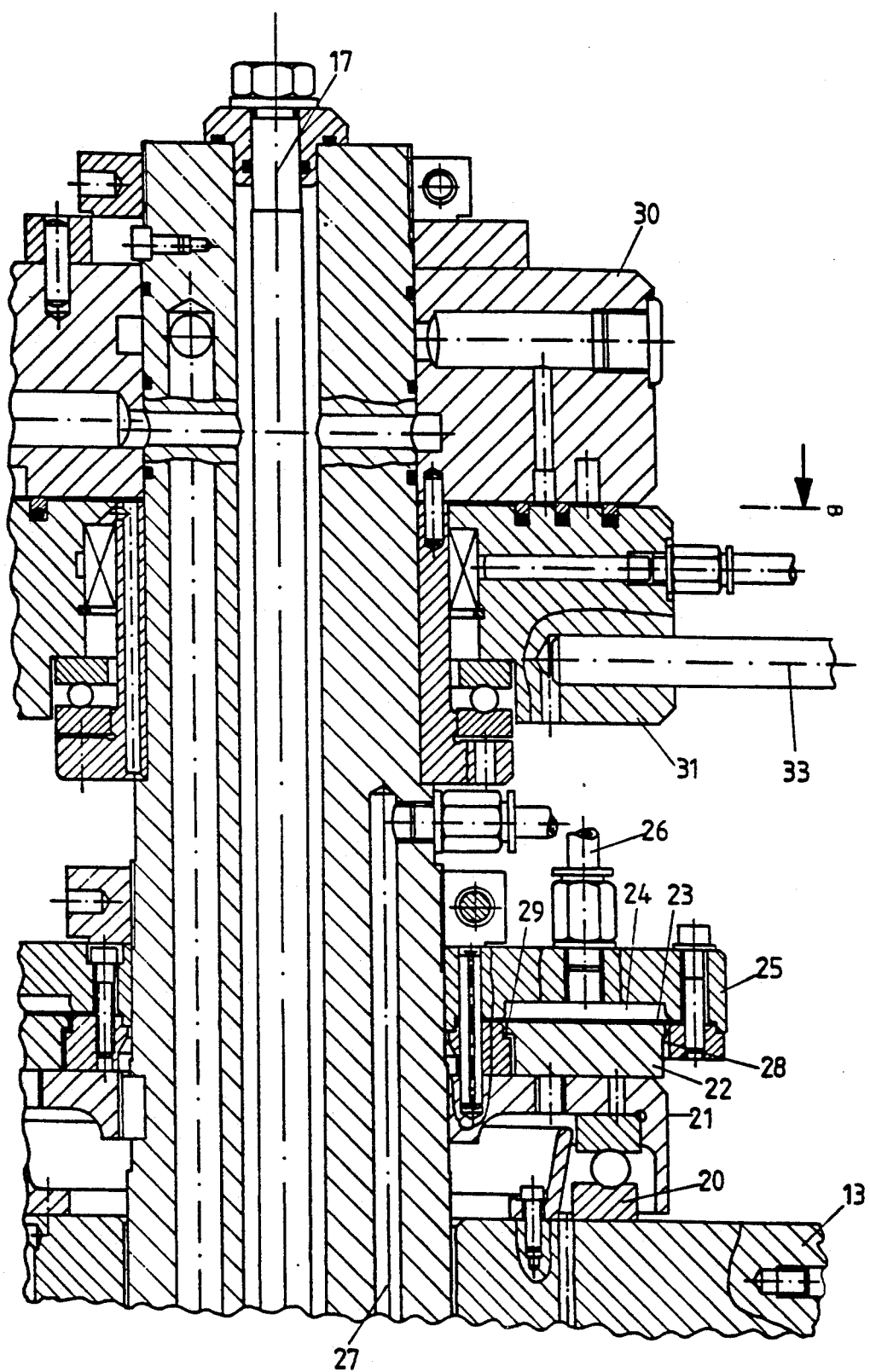
FIG. 3: an enlarged presentation of the device according to FIG. 2 in the region of the pneumatic spring.

In the presentation according to FIG. 2 a part of the blow wheel (8) is shown in the region of which a control disk (12) and a carrier disk (13) are disposed. The carrier disk (12) is fixed and connected to a center column (14) relative to which the carrier disk (13) is mounted rotatably. In order to guide the carrier disk (13) relative-to the center column (14) a bearing is provided, that, for example, can be a needle bearing. The control disk (12) contains grooves (16) which are essentially disposed concentric with a center line (17) of center column (14). By a corresponding subdivision of grooves (16) it is possible to facilitate pressure feed-in as well as pressure release. In order to sense the pressure conditions prevailing in the grooves (16) the carrier disk (13) contains bores, which essentially extend transverse to a separating plane (19) which separates control disk (12) from carrier disk (13). In the region of separating plane (19) a area gasket is disposed in order to insure a sufficient seal.

The carrier disk (13) is connected at its portion located away from the control disk (12) to an axial bearing (20), which is aligned with the central column (14) by a guide element (21). In the region of its extension away from axial bearing (20) the guide element (21) is mounted to a piston (22), which in the region of its extension disposed away from the guide element (21) is supported by a membrane (23). Membrane (23), piston (22) and guide element (21) are disposed slideably in the direction of center line (17). Membrane (23) separates piston (22) from an interior space (24) which is limited by a housing (25) at its portion disposed away from membrane (23). Housing (25) is firmly joined to center column (14) and serves as a thrust bearing for receiving the counter forces resulting from the pressurization of carrier disk (13). The interior space (24) is connected to a compressed air supply (27) by a supply line (26), which runs in the region of center column (14).

For ensuring a sufficiently large pressure area it was in particular contemplated to generate piston (22) as an annular piston, which is disposed essentially concentric with center line (17). In order to limit the stroke of piston (22) it is possible to furnish piston (22) with a step engaging a protrusion (29), which is disposed in the region of housing (25). Control disk (12) and carrier disk (13) are especially well suited to co-ordinate working air for the operation of pneumatic elements in the region of blow station (19). To feed blow air for molding the preforms (5) into containers (10) a blow air-control disk (30) and a blow air carrier disk (31) are provided. Here too concentric grooves and corresponding bores co-ordinate the pressure feed. Via carriers (32,33) the blow air carrier disk (31) and carrier disk (13) are connected to rotating blow wheel (8).

Figure 4:
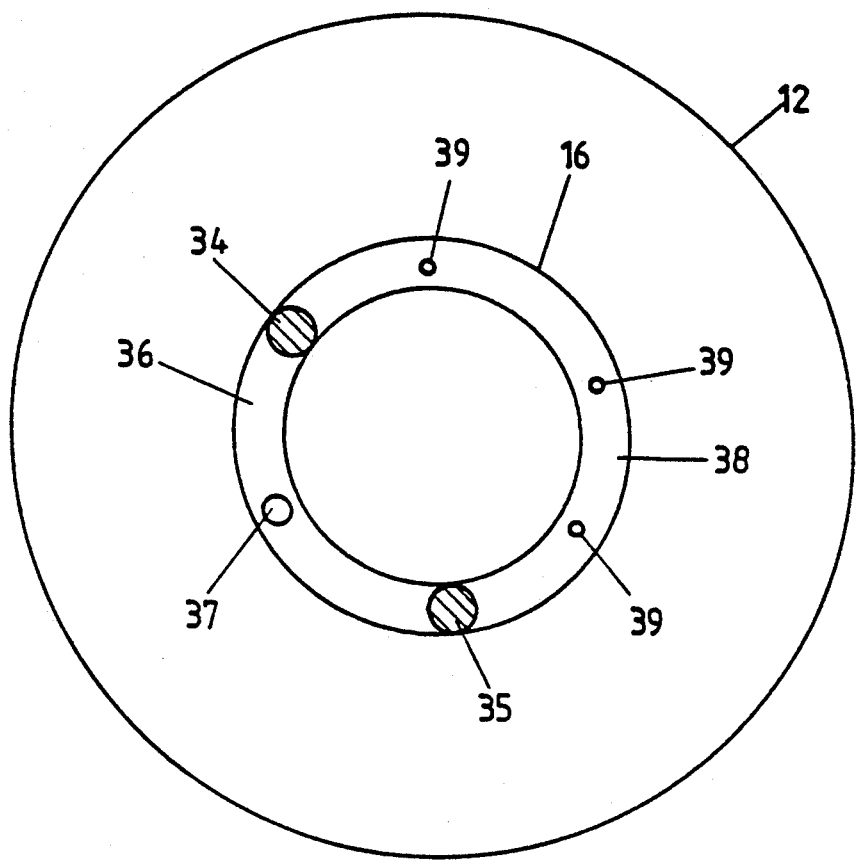
FIG. 4: a schematic presentation of a top view of a control disk.
Figure 5:
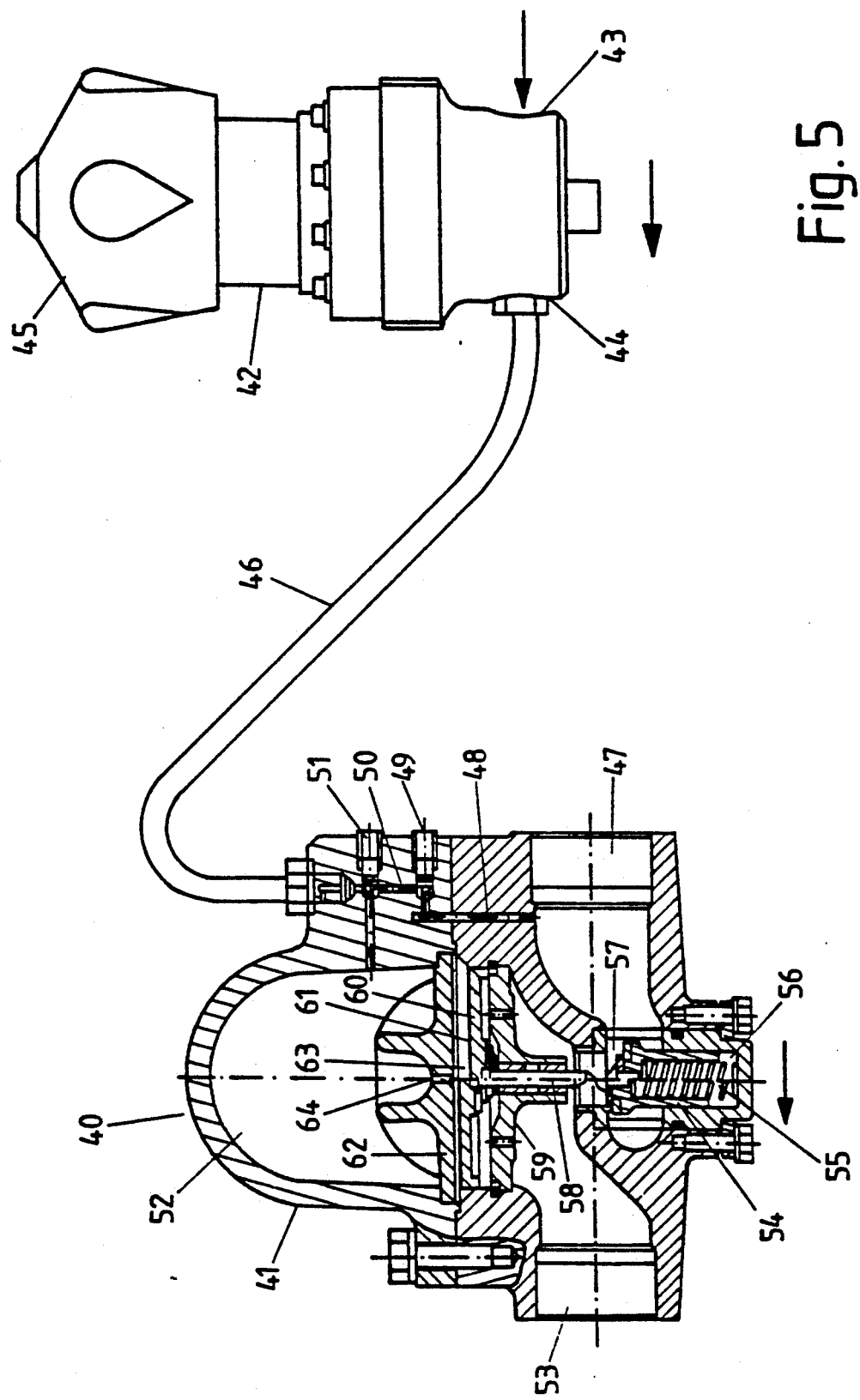
FIG. 5: a sectional view of a two-step pressure reducer in which, in the region of the main pressure reducer, two functional positions are shown.

In the presentation according to FIG. 4 groove (16) is subdivided in the region of control wheel (12) by separating elements (34,35). One sector (36) is supplied with compressed air via a. bore (37) and in the region of a sector (38) exhaust bores (39) are provided for the exhaust. For setting the magnitude of the pressures to be distributed a pressure regulator (40) shown in FIG. 5 can be used. Pressure regulator (40) consists of a main regulator (41) and a pre-regulator (42). The pre-regulator (42) has an inlet (43) and an outlet (44). Between inlet (43) and outlet (44) is a blocking element adjusting the resistance to flow, which is adjustable with a hand wheel (45). Pre-regulator (42) conducts a control pressure through a connecting line (46) to main regulator (41). Main regulator (41) has an inlet (47) which is connected to an inlet needle valve (49) by a connecting bore (50). Inlet needle valve (49) is connected to control needle valve (51) by connecting bore (50). Connecting passage (46) is also brought into the region of control valve (51). A further connection is made to a dome-shaped interior space (52), which is connectable to outlet (53). In order to affect the flow resistance between inlet (47) and outlet (53) a blocking element (54) is provided, which is pre-loaded by a spring (55).

Spring (55) extends essentially into an interior space (56) of the essentially cylindrical blocking elements (54). Blocking element (54) is disposed in a connecting channel (57), which connects inlet (47) with outlet (53). Positioning of the blocking element (54) occurs by means of an adjusting needle (58), which applies an pre-load to blocking element (54) acting in a direction opposite to that of spring (55). Adjusting needle (58) is located in the region of a bearing (59) and is acted upon by an adjustment piston (60), the boundary of which is turned away from adjusting needle (58) and is facing a membrane (61). Membrane (61) and a dome-shaped bottom (62) define a stroke volume (63), which is connected to a dome-shaped interior (52) by a passage (64).

Figure 6:
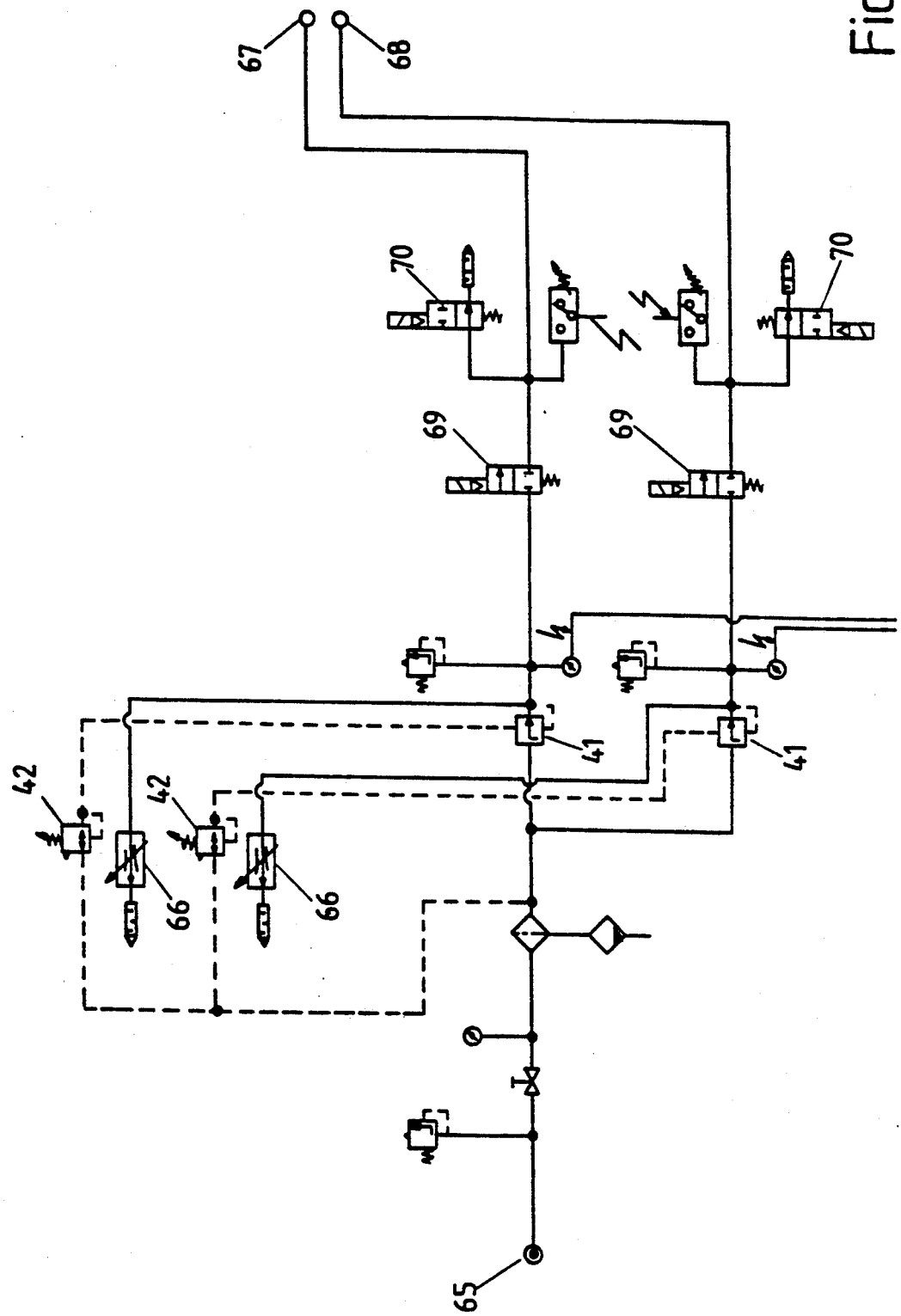
FIG. 6: a pneumatic circuit diagram for clarifying the function of the pressure reducer.

In order to set a pressure in the region of outlet (53) a supply pressure is directed to inlet (47) of main regulator (41) and to inlet (43) of pre-regulator (42). Inlet valve (49) is closed during this operating mode and control valve (51) is open. By virtue of having a control pressure in readiness from the pre-regulator (42) costly adjustment efforts in the region of needle valves (41,42) are not needed. By reason of the pressure entering the region of the dome-shaped interior space (52) membrane (61) is shifted and adjustment piston (60) put in place. The placement of adjusting piston (60) is transferred to adjusting needle (58) and by the combined action of the pressure force in the region of the membrane (61) and the counter force produced by spring (55) an adjustment of blocking element (54) occurs. In the case of the pneumatic arrangement of FIG. 6, two main regulators (41) are provided, each of which is controlled by a pre-regulator (42). Main regulator (41) and pre-regulator (42) are fed by a common supply connection (65). In order to insure a minimum flow volume outlets (53) of the main regulator (41) are connected to outlet means (66). By way of taps (67,68) compressed air can be supplied to the blow device (2). The blow air is switched on by means of solenoid valves (69,70). By means of solenoid valves (70) the three passages connected to blow device (2) can be exhausted.

Figure 7:
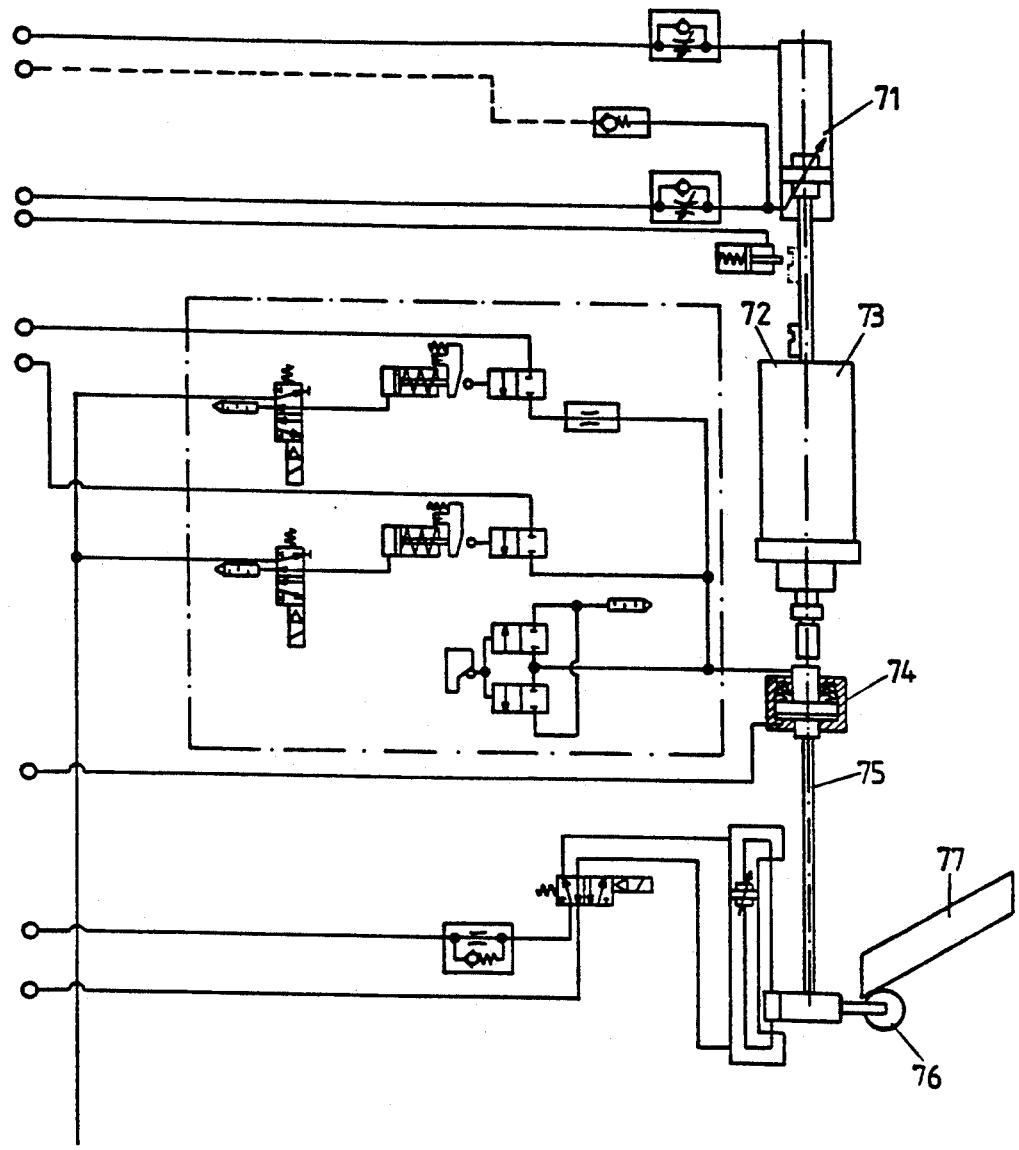
FIG. 7: a schematic of the pneumatic controls in the region of the blow station.

FIG. 7 shows essential pneumatic elements in the region of blow station (9). They are a displacement cylinder (71) for positioning of a bottom die, blow mold halves (72,73) for generating the contour of the container to be shaped, a connecting piston (74) turned away from the displacement cylinder (71) and rack rod (75). In order to co-ordinate a stroke motion of the rack rod (75) a steering roll (76) is provided, which contacts a curved track (77).

Figure 8:
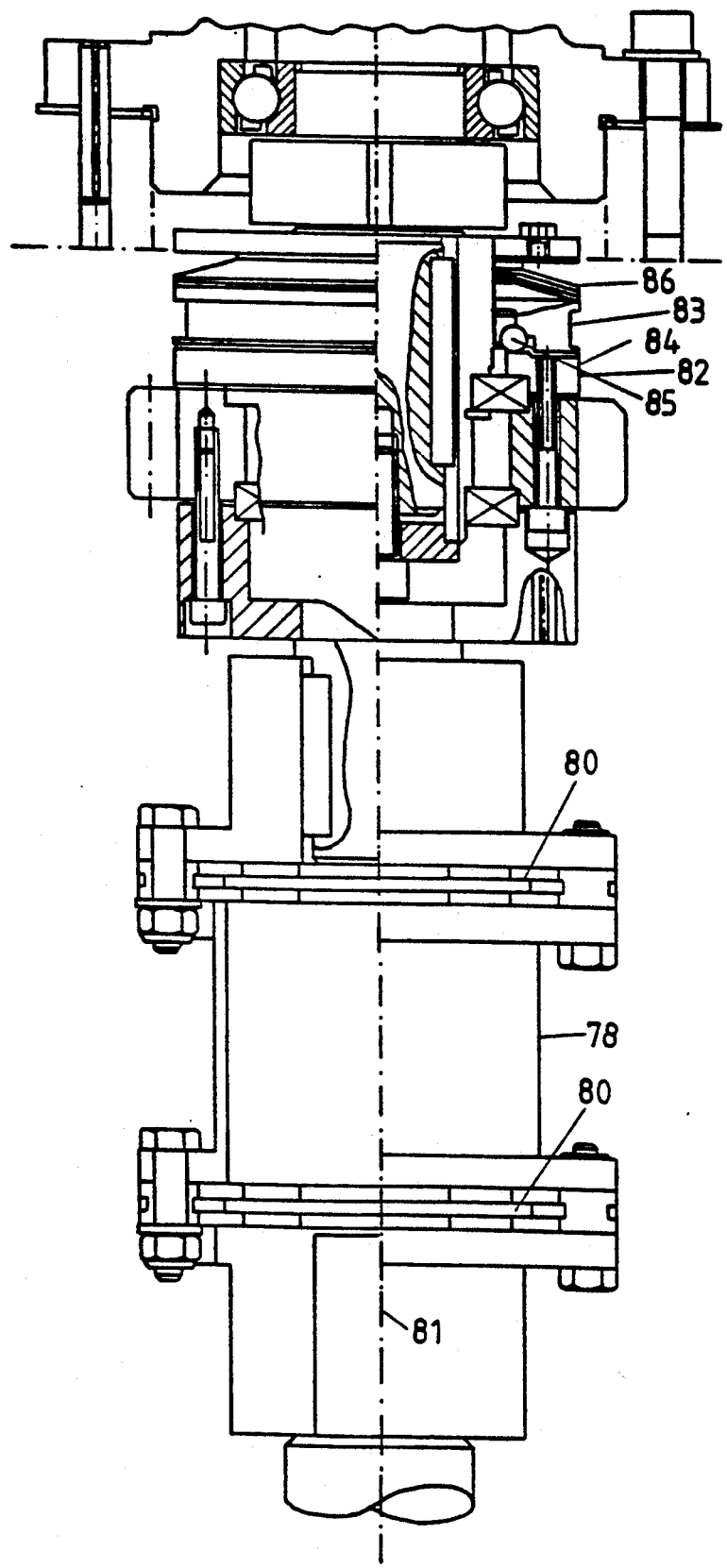
FIG. 8: a side view of a combination of a torsionally stiff coupling and an overload coupling

FIG. 8 shows a side view of torsionally rigid coupling (78) compensating for tolerances. Such a torsionally rigid coupling (78) can be provided especially usefully in the region of a transfer device (7) or in the region of a load station (79). In the region of the torsionally rigid coupling (78) sheetmetal stacks (80) are disposed, which are flexible in a direction perpendicular to the longitudinal axis (81) and which by virtue of this flexibility compensate for tilting and axial displacement of the components to joined. There is further an escape coupling (82), which allows disconnection at a predetermined maximum load. For this purpose coupling parts (83,84) are provided, in the region of which recesses for carrying a ball (88) are provided. When an allowable load is exceeded ball (85) is pushed out of the recess and a connection between coupling parts (83,84) is severed. Compression of coupling parts (83,84) within the operating range is ensured by spring (86). The disconnect coupling (82) can be either made in such a way that it re-engages or that the disengagement occurs in a stable mode and the disconnected state pertains until a targeted re-engagement process takes place.

Figure 9:
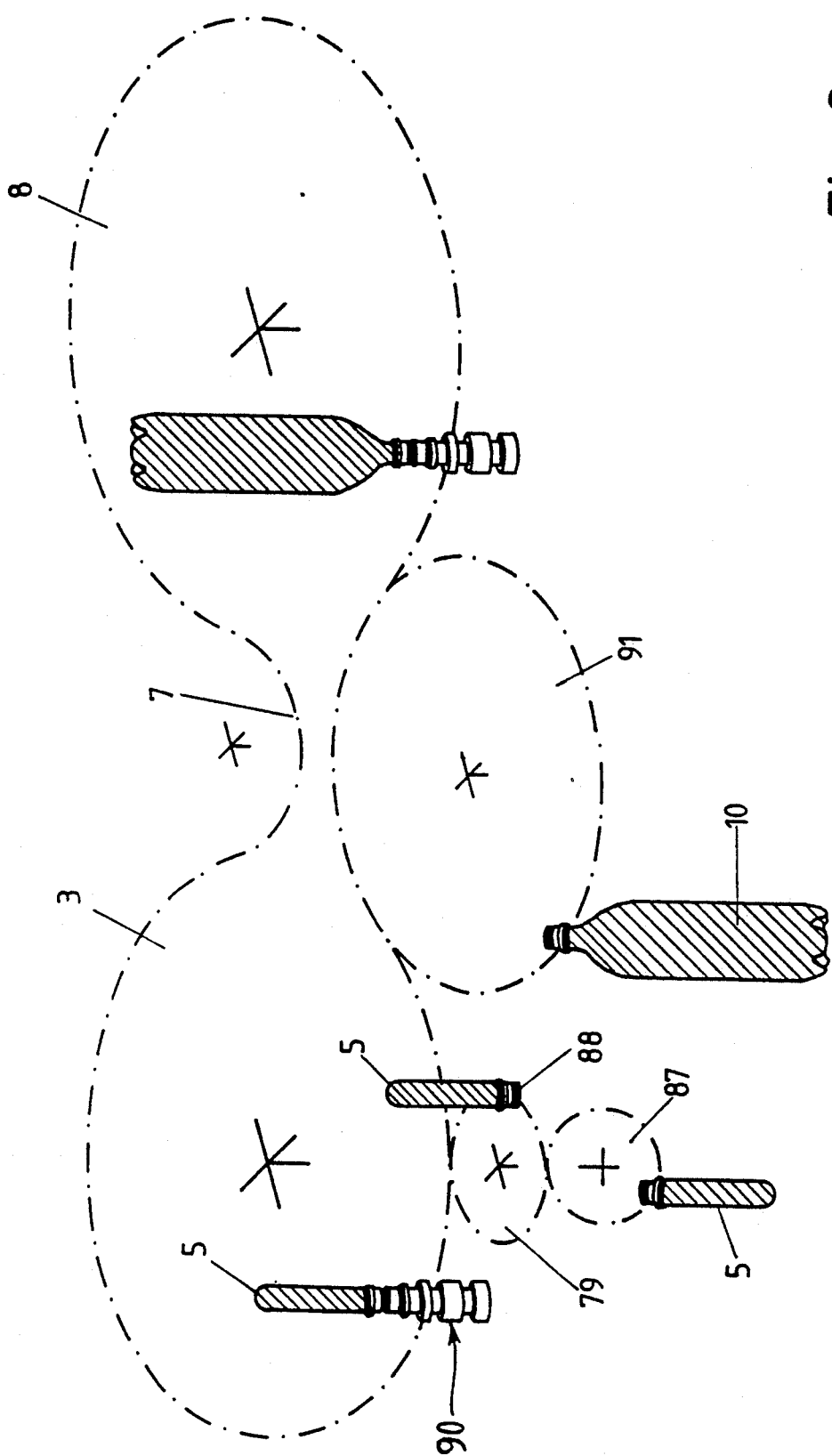
FIG. 9: a schematic of adaptors for cycle for receiving preforms in the region of the blow wheel, an unloading wheel, as well as a heating wheel.

In order to clarify the function of this device an illustration is provided in FIG. 9. The preform (5) is first brought to a turning wheel (87) in the region of which it is positioned with its mouth area (88) vertically down. By means of a loadstation (79) it is transferred to heating wheel (3). In the region of this heating wheel (3) preform (5) is held by adaptor (90). Adaptor (90) is transferred by a transfer device (7) together with preform (5) to blow wheel (8) after heating and is there shaped into container (10). In the region of an unloader arm (91), container (10) is taken off adaptor (90) and the adaptor (90) is returned to the region of heating wheel (3) to receive a new preform (5).

By virtue of generating forces which are independent of volume by means of membrane (23) it is possible to avoid subsequent adjustments which might be required due to wear problems. The magnitude of the force generated merely depends on the area of membrane (23) and the magnitude of the pressure in the region of the interior space (24). Volume changes due to wear are thus without influence.

I claim:

1. A device for blow forming thermoplastic material containing a heating device for the tempering of preforms and a blow device for receiving said tempered preforms from said heating device and for blow molding the preforms into a container, said blow device including a rotating wheel carrying at least one blow molding station, a carrier disk rotatably supported in said blow device and a preloadable control disk for controlling said blow station, wherein said carrier disk and said control disk cooperating to supply fluid under pressure to said blow molding station, said control disk including a surface having a plurality of grooves to which pressurized fluid is supplied, said carrier disk including a surface having a plurality of grooves, preloading means for urging said carrier disk surface into sealing engagement with said control disk surface with respective ones of said carrier disk grooves being in sealed fluid communication with selected ones of said control disk grooves whereby fluid at different pressures may be supplied to said blow molding station, said preloading means comprising at least one pneumatic spring supported on said device and operative to urge said carrier disk surface into sealing relationship with said control disk surface, and said pneumatic spring is connected to a pressure relief device allowing pressure free maintenance.

2. Device according to claim 1, wherein said pneumatic spring consists essentially of a membrane (23) and a piston (22) preloaded by said membrane (23).

3. Device according to claim 2, wherein said piston (22) is an annular piston positioned essentially concentric with an axis of rotation of said carrier disk (13).

4. Device according to claim 2, wherein said pneumatic spring includes a piston (22) which is provided with a shoulder (28) which engages a projection (39) in a stroke limiting manner, said projection being provided on a housing portion of said device containing piston (22).

5. Device according to claim 1, wherein said control disk (12) is fixedly located in the region of a center column (14) of said device and said carrier disk (13) is held rotatably in the region of said center column (14).

6. Device according to claim 1, wherein said blow station (9) is equipped with at least two blow forms halves determining a contouring of a container (10) to be formed from a preform (5).

7. Device according to claim 1, wherein said device includes at least two pressure regulators for supplying said fluid pressures.

8. Device according to claim 1, wherein said heating device includes a heating wheel, heating elements and a loading station (89), said loading station being provided for loading of said preforms on said heating wheel (3) and said heating wheel being operative to transport said preforms (5) in the region of said heating elements (4).

9. Device according to claim 8, wherein a rotatably mounted transport wheel is positioned in the region of said loading station (89), which transport wheel is connected by a rotationally rigid coupling (78) to a drive.

10. Device according to claim 9, wherein said rotationally rigid coupling includes a disconnect coupling (82) in the region of the loading station (89) for the prevention of overloads.

11. Device according to claim 8, wherein a transfer device (7) is provided for transferring said preforms from said heating wheel to said rotating wheel.

12. Device according to claim 11, wherein said transfer device (7) includes a rotatably mounted transfer wheel connected by a torsionally rigid coupling (78) to a drive.

13. Device according to claim 12, wherein said torsionally rigid coupling (78) is connected to said transfer wheel by a disconnect coupling (82).

14. Device according to claim 1, wherein said control disk grooves (16) are provided on said control disk (12) in essentially concentric relationship with the axis of rotation of said carrier disk, each of said control disk grooves containing at least one pressure transmitting sector (36) and a pressure relieving section (38).

15. Device according to claim 1, wherein said carrier disk (13) is connected to said preloading means (22) by an axial bearing (20).

16. Device according to claim 1, wherein a pressure regulator (40) is provided to ensure a supply of said pressurized fluid with preadjustable pressures, said regulator consisting essentially of a main regulator (41) and a pre-regulator (42) operative to adjust said main regulator (41).

17. Device according to claim 16, wherein said pre-regulator (42) is connected with a handwheel (45) for determining the flow cross section of said pre-regulator.

18. Device according to claim 16, wherein said pre-regulator (42) is operative to supply a control pressure to said main regulator to thereby position a blocking element (54), said blocking element determining the flow resistance of pressurized fluid through said main regulator.

* * * * *